United States Patent
Ashton et al.

(10) Patent No.: US 7,406,580 B2
(45) Date of Patent: Jul. 29, 2008

(54) METHOD FOR UTILIZING TAPE MEDIA SEGMENTATION

(75) Inventors: Lyn Lequam Ashton, Tucson, AZ (US); Erika Marianna Dawson, Tucson, AZ (US); Lisa Joan Gundy, Tucson, AZ (US); Stanley Mark Kissinger, Tucson, AZ (US); Michael Ray Noel, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 504 days.

(21) Appl. No.: 10/648,584

(22) Filed: Aug. 25, 2003

(65) Prior Publication Data

US 2005/0050263 A1   Mar. 3, 2005

(51) Int. Cl.
*G06F 12/00* (2006.01)
(52) U.S. Cl. .................... 711/173; 711/111; 360/134
(58) Field of Classification Search ................ 711/111, 711/173; 360/134
See application file for complete search history.

(56) References Cited

U.S. PATENT DOCUMENTS

| 5,287,459 | A | * | 2/1994 | Gniewek ................... 711/111 |
| 5,572,378 | A | | 11/1996 | Schwarz et al. .............. 360/48 |
| 5,710,676 | A | * | 1/1998 | Fry et al. ................... 360/72.1 |
| 5,757,571 | A | * | 5/1998 | Basham et al. ............. 360/72.1 |
| 5,969,893 | A | * | 10/1999 | Basham et al. ................ 360/49 |
| 6,031,698 | A | | 2/2000 | Bar ............................. 360/134 |
| 6,031,798 | A | * | 2/2000 | James et al. ............. 369/30.28 |
| 6,064,553 | A | * | 5/2000 | Allen et al. ................. 360/132 |
| 6,204,987 | B1 | | 3/2001 | Dahlerud ................... 360/74.6 |
| 6,226,441 | B1 | | 5/2001 | Hartung et al. ............... 386/46 |
| 2001/0002477 | A1 | * | 5/2001 | Cadden et al. .............. 711/111 |
| 2002/0151992 | A1 | * | 10/2002 | Hoffberg et al. ............. 700/83 |
| 2005/0050055 | A1 | * | 3/2005 | Chang et al. ................ 707/100 |

FOREIGN PATENT DOCUMENTS

JP   10-232800   9/1998

* cited by examiner

*Primary Examiner*—Donald Sparks
*Assistant Examiner*—Jared I Rutz
(74) *Attorney, Agent, or Firm*—Kunzler & McKenzie

(57) ABSTRACT

A method is presented for utilizing tape storage media segmentation to improve data access performance. A segmented tape storage medium within a tape cartridge having a first and second segment is utilized. A selection module allows a user to select a user-defined capacity of the tape storage medium that is less than the usable capacity of the tape storage medium. The user-defined capacity allows the user to prefer improved data access over tape storage capacity. Data, when written to the tape, is written only within the user-defined capacity. Data may be written exclusively on the first segment or written on both the first segment and second segment allowing data access to be improved. In addition, the user-defined capacity may correspond to the full capacity of the tape storage media.

5 Claims, 7 Drawing Sheets

METHOD FOR UTILIZING TAPE MEDIA SEGMENTATION

BACKGROUND OF THE INVENTION

1. Field of the Invention

The present invention relates to tape storage media and more particularly, to utilizing tape storage media segmentation to improve data access performance in a tape storage system.

2. Description of the Related Art

With each new generation of tape storage technology, the capacity of available tape storage medium increases. The total storage capacity of a tape depends on many factors, including the physical dimensions of the tape, the data compression, if any, used to write data to the tape, the number of tracks across the width of the tape, and so forth. Another factor that may distinguish physical capacity from usable capacity is that the usable capacity is often defined to be slightly less than the physical capacity. This is due, in part, to servo tracks, data block headers, and other metadata blocks throughout the tape.

As total tape storage capacity increases, however, so too does the time required to access data on a tape. For many data storage uses, such as a data backup, longer access time to the data is acceptable. However, many other data storage applications would at, benefit from faster data access times even though tapes of greater capacity and increased data access times are used in the storage system.

For tape storage applications, data is typically stored onto a magnetic tape medium, such as a metallic ribbon, within a tape cartridge using a tape drive. The tape medium conventionally is designed to include a plurality of tracks that are distributed across the physical width of the tape medium and run the physical length of the tape medium. A tape write head within the tape drive is typically capable of writing up to sixteen tracks at one time, starting at one end of the tape and moving along the length of the tape. When the tape write head reaches the end of the tape, the head is aligned over the proximate track set, the direction of the tape is reversed, and the write head writes an additional sixteen tracks in the opposite direction. This "serpentine" pattern may continue until all tracks have been written.

The process for reading data from the tape medium is essentially the same. A tape read head moves across the tape medium and reads sixteen tracks from one end of the tape medium to the other. The tape read head then realigns to read an additional sixteen tracks and moves over the second set of tracks in the opposite direction.

Given the large capacity of conventional tape storage devices, various data blocks may be stored on a single tape medium. The location of each of these data blocks may be marked on the tape using block header information, data pads (areas of tape where data is intentionally not written), and other conventional identification means and methods. The tape read head is able to locate a particular block of data by using one or more servo tracks that are written onto the tape storage medium.

More recently, manufacturers of tape storage products have directed their attention in part to improving data access time using tape storage drives and cartridges. One method that has been employed to address the problem of increased data access time is to employ various levels of transparent buffering in which tape data may be stored in connection with other storage mediums, such as a direct access storage device (DASD) or an optical disk. If the requested tape data is stored on a DASD cache, data retrieval time may be improved greatly. However, the storage capacity of a DASD cache is typically significantly less than that of a tape storage system, and the DASD cache must migrate much of the data to tape cartridges in order to be able to buffer more recent data. For this reason, a DASD cache only improves data retrieval time for data that is in the DASD cache at the time of the data request, but does not improve the time for much of the data that has been migrated to tape and demoted from the cache.

In the case of storing data on an optical disk, data access times may be improved over that of a tape, but typically the storage capacity of an optical disk is much less than that of a tape cartridge. Currently, technology allows as much as 300 Gb of non-compacted data to be stored on a single, standard tape cartridge.

Another method of improving data access time is to segment the tape storage medium into two or more segments and to write data to the segments in a sequential manner. A tape segment may include a specified capacity, or physical length of tape, that is less than the total capacity of the tape. For example, a tape storage medium may be divided into two segments. When writing data to the tape, the data is written to the first segment and then to the second segment. This method improves data access time in that the first segment may be written to or read from without physically forwarding all the way to the end of the tape storage medium.

The first segment may include, for example, only one fifth of the total tape storage capacity, and data access time is greatly improved when the first segment is located at the physical beginning of the tape. In this way, the tape drive need only advance one fifth of the way through the total length of the tape medium, rather than all the way to the physical end of the tape, before reversing direction. The data stored in the capacity of the first segment is located near the beginning of the tape, rather than being distributed along the entire length of the tape improving data access time. The data stored in subsequent segments is distributed further from the beginning of the tape which increases the data access time.

What is needed is a process, apparatus, and system for improving data access performance of a tape storage system using tape media segmentation. Beneficially, such a process, apparatus, and system would allow a user to take advantage of the tape media segmentation in order to quickly access specified data.

BRIEF SUMMARY OF THE INVENTION

The present invention has been developed in response to the present state of the art, and in particular, in response to the problems and needs in the art that have not yet been fully solved by currently available tape storage media devices and methods. Accordingly, the present invention has been developed to provide an apparatus, system, and process for utilizing tape storage media segmentation to improve data access performance that overcome many of the above-discussed shortcomings in the art.

The apparatus for utilizing tape media segmentation to improve data access performance is provided with a logic unit containing a plurality of modules configured to functionally execute the necessary steps of utilizing tape storage media segmentation to improve data access performance. These modules in the described embodiments include a segmentation module, a selection module, a mapping module, an identification module, a write module, and a read module.

The apparatus, in one embodiment, is configured to allow a user to select a user-defined capacity that is less than the physical capacity and usable capacity of the tape storage medium. The user-defined capacity may be defined to be the same as the capacity of a first segment of the tape storage medium or may be defined to be less than or greater than the capacity of a first segment of the tape storage medium. In one embodiment, the user-defined capacity may span two or more segments of the tape storage medium.

In a further embodiment, the apparatus may be configured to allow the user to select the user-defined capacity of the tape storage medium at any time before or after the data has been stored on the tape storage medium. If selected after, however, the user-defined capacity may be limited to a capacity equal to or larger than the currently used capacity of the tape, unless provisions are made to, for example, transfer the data from the unspecified portion of the tape to another tape or storage device.

The apparatus is further configured, in one embodiment, to utilize the segmentation of the tape storage medium. The apparatus may be capable of reading a parameter within a storage device, such as a tape storage server, that defines the tape media segmentation of a particular tape cartridge.

In a further embodiment, the mapping module within the apparatus is configured to associate the user-defined capacity with the tape cartridge on which the tape storage medium is provided. In other words, the mapping module is configured to store a table entry identifying the capacity usage of the tape storage medium within a given tape cartridge.

In a further embodiment, the write module within the apparatus is configured to write data to the tape storage medium within the user-defined capacity. The read module within the apparatus is configured to read data from the tape storage medium.

The identification module within the apparatus is configured to identify the tape cartridge as "full" when a substantial portion of the user-defined capacity of the tape storage medium is used to store the data. For example, if a user defines the capacity of a particular tape cartridge to be 30%, the identification module is configured to mark the tape "full" when data is written to approximately 30% of the tape. The user-defined 30% capacity may include a portion of the first segment or, in another embodiment, may fully include at least the first segment of the tape storage medium.

A system of the present invention is also presented for utilizing tape media segmentation to improve data access performance. The system may be embodied as a host computer accessing a tape storage subsystem which consists of one or more tape drive units, a plurality of tape cartridges, and optionally an automatic tape library unit, a virtual tape server (VTS), and a storage area network (SAN).

In particular, the system, in one embodiment, includes a tape storage system configured to communicate data to and from a segmented tape cartridge. The system also includes a segmentation module, a selection module, a mapping module, a write module, an identification module, and a read module, each configured as described above. In a further embodiment, the segmentation module may be further configured to actually specify and enable the segmentation layout on the tape storage medium.

A process of the present invention is also presented for utilizing tape media segmentation to improve data access performance. The process in the disclosed embodiments substantially includes the steps necessary to carry out the functions presented above with respect to the operation of the described apparatus and system. In one embodiment, the process includes using a tape cartridge that has a tape storage medium, using two or more segments on the tape storage medium, and allowing a user to select a user-defined capacity that is less than the usable capacity of the tape storage medium.

As described above, the user-defined capacity may be less than, equal to, or greater than the capacity of the first segment of the tape storage medium. Also, a user may define the capacity at one of several times during the use of a tape cartridge, depending on the limitations outlined above.

In a further embodiment, the process includes associating the user-defined capacity of the tape storage medium with the tape cartridge, such as by recording the name or other identifier of the tape cartridge in a table. The process described may also include writing data to the tape storage medium within the user-defined capacity, identifying a tape cartridge as "full" when a substantial portion of the user-defined capacity of the tape storage medium is used to store the data.

A computer readable storage medium is also presented and configured to store computer code to carry out the process for utilizing tape storage media segmentation to improve data access performance.

These features and advantages of the present invention will become more fully apparent from the following description and appended claims, or may be learned by the N° m practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 1:
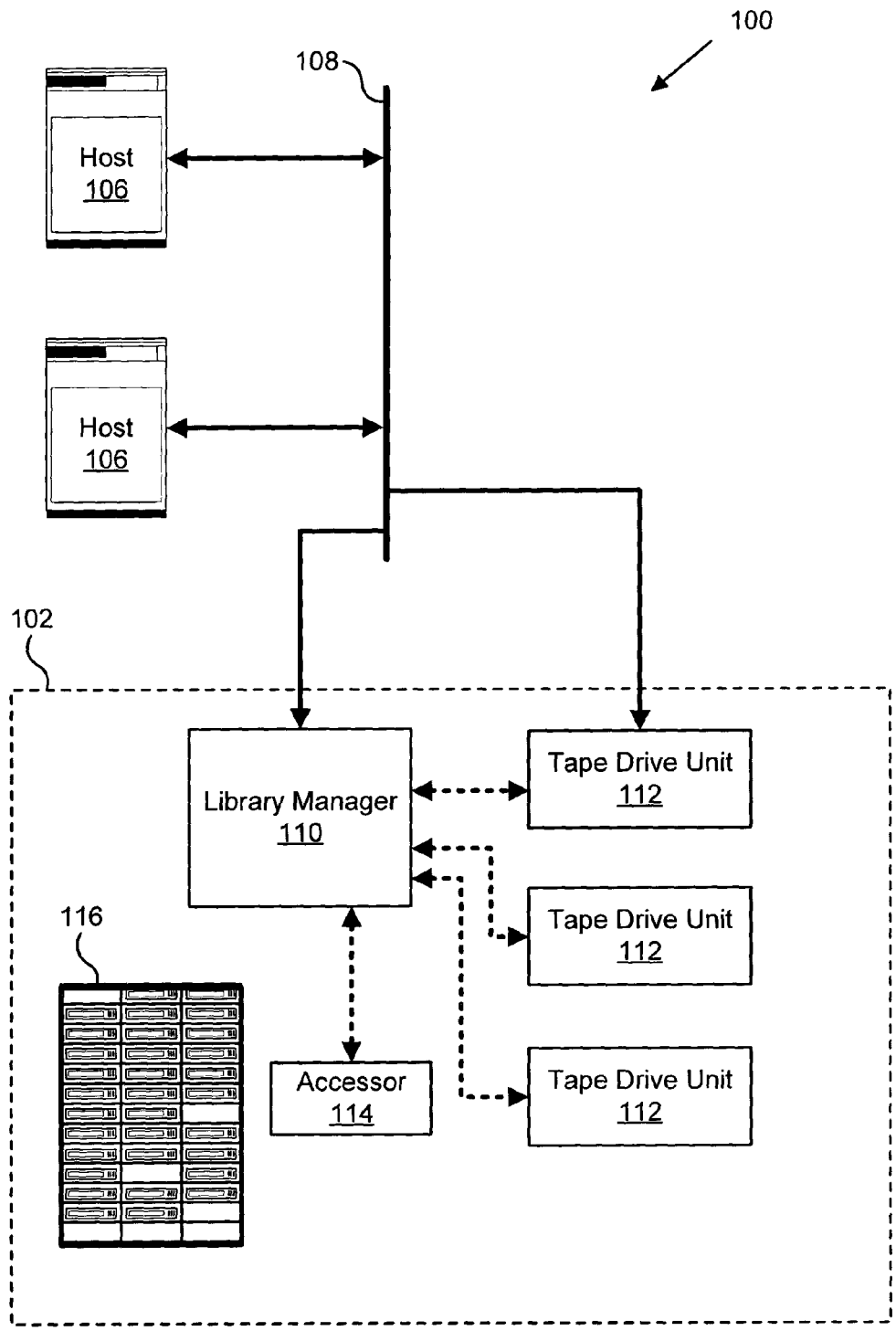
FIG. 1 is a schematic block diagram illustrating one embodiment of a tape storage system in accordance with the present invention.

FIG. 1 depicts a schematic block diagram of one embodiment of a tape storage system 100 that may be employed in accordance with the present invention. The tape storage system 100 shown includes an optional automated tape library unit 102, and at least one host 106. Each host 106 may be a mainframe computer. Alternatively, the host 106 may be a server or personal computer using one of a variety of operating systems. The host 106 is connected to the optional automated tape library unit 102 via a storage area network (SAN) or similar communication channel 108. Alternatively, the host 106 may be connected directly to a tape drive. The communication channel 108, in one embodiment, may be a FICON or ESCON.

The illustrated automated tape library unit 102 includes a library manager 110, one or more tape drive units 112, an accessor 114, and a plurality of tape storage media cartridges 116. The plurality of tape storage cartridges 116 may be stored in one or more media cartridge storage bins (not identified).

The library manager 110, which may include a computing processor (not shown), is interconnected with and controls the actions of the tape drive units 112 and the accessor 114. The library manager 110 also may include one or more hard disk drives (not shown) for memory storage, as well as, a control panel or keyboard (not shown) to provide user input. The control panel may be, in one embodiment, a computer in communication with the library manager 110 so that a user can control the operating parameters of the automated tape library unit 102 independently of the host 106.

In FIG. 1, three tape drive units 112 are shown. The present invention is operable with one or any larger number of tape drive units 112. The tape drive units 112 may share one single repository of tape storage cartridges 116. Alternatively, the tape drive units 112 may independently correspond to and utilize multiple repositories of tape storage cartridges 116. The tape drive units 112 may advantageously be distributed over multiple locations to decrease the probability that multiple tape drive units 112 will be incapacitated by a disaster in one location.

The interconnections between the library manager 110, the tape drive units 112, and the accessor 114 are shown as dashed lines to indicate that the depicted library manager 110 transmits and receives control signals to the tape drive units 112 and the accessor 114. Data for storage or retrieval may be transmitted directly between the host 106 and the tape drive units 112 via a communication channel 108, which may be a storage area network (SAN), a local area network (LAN), a wide area network (WAN), or a different type of network, such as the ESCON, FICON, the Internet or a direct connection between the host 106 and the tape drive devices 112.

The accessor 114 may be a robotic arm or other mechanical device configured to transport the selected tape storage cartridges 116 between a storage bin and a tape drive unit 112. The accessor 114 typically includes a cartridge gripper and a bar code scanner (not shown), or similar read system, mounted on the gripper. The bar code scanner is used to read a volume serial number (VOLSER) printed on a cartridge label affixed to the cartridge 116. In alternative embodiments, the tape drive units 112 may be replaced by optical disk drives or other magnetic drives. Similarly, the tape storage cartridges 116 may be replaced by other storage media cartridges utilizing magnetic media, optical media, or any other removable media corresponding to the type of drive employed.

Figure 2:
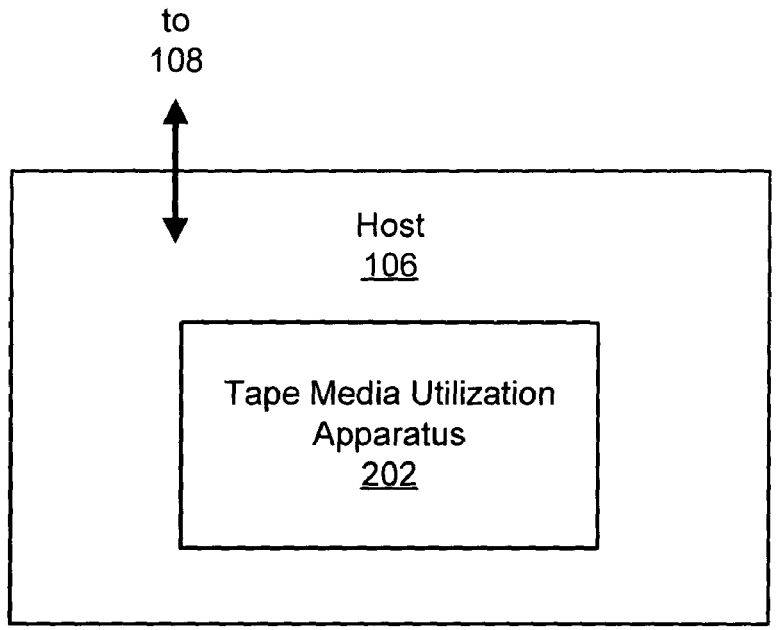
FIG. 2 is a schematic block diagram illustrating one embodiment of a tape media utilization apparatus in accordance with the present invention.

FIG. 2 illustrates one embodiment of a tape media utilization apparatus 202 within the scope of the present invention. In one embodiment, the tape media utilization apparatus 202 is implemented within the host 106. In another embodiment, the tape media utilization apparatus 202 may be implemented within a library manager 110 or individual tape drive 112.

The tape media utilization apparatus 202 provides the functionality that permits the media cartridges 116 to be used in segmented form. As mentioned above segmentation of the tape media allows for faster data access because the tape drive heads may traverse a segment of a lengthy tape more quickly than the whole length of tape. Accordingly, because tapes are read sequentially from start to end, the first segment provides faster access to data stored thereon. One or more subsequent segments provide additional storage capacity, but have longer data access times.

Preferably, segmentation of the tape media cartridge 116 permits a first segment to be used either exclusively or in conjunction with one or more subsequent segments. If the first segment is used exclusively, a user may specify the capacity of the first segment. The capacity for the first segment may be specified as a specific number of bytes or as a certain percentage of the full capacity for the tape media cartridge 116. In addition, both a first segment and a second segment may be used to store the user's data. The second segment may store a portion of a first dataset or a completely different dataset.

Figure 3:
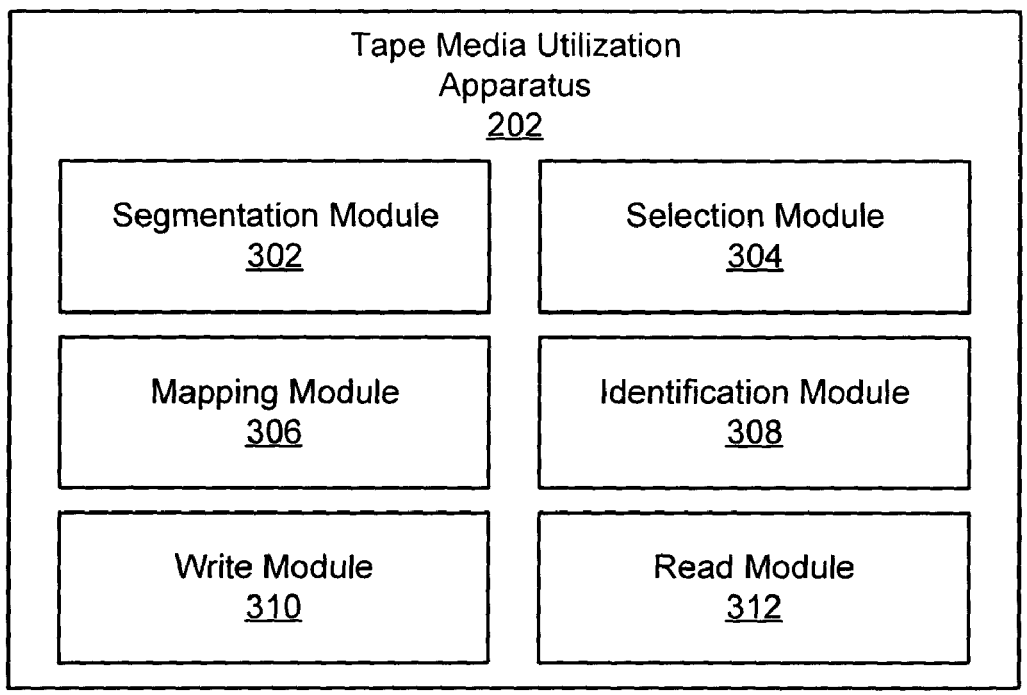
FIG. 3 is a schematic block diagram illustrating one embodiment of a tape media segmentation apparatus in accordance with the present invention.

FIG. 3 depicts one embodiment of a tape media utilization module 202 that includes a segmentation module 302, a selection module 304, a mapping module 306, an identification module 308, a write module 310, and a read module 312. In one embodiment, the segmentation module 302 is configured to access a first and second segment on a tape storage medium. In a further embodiment, the segmentation module 302 is configured to divide a tape storage medium into multiple segments, such as a first segment and a second segment. This segmentation may be done automatically by the tape drive unit 112, for example, or may occur in response to a user input specifying a user defined segmentation layout. Furthermore, the capacity of the first and second segments may be defined according to historical data access information and performance criteria.

The selection module 304 may be configured to allow a user to define an amount of the tape storage medium that may be used to record data. The selected capacity may or may not be substantially equivalent to the capacity of the first segment. In one embodiment, an application on the host 106 may automatically select the full storage capacity of the tape storage medium if no user-defined capacity is input. Such a selection favors storage capacity over data access performance. Otherwise, a user may select a user-defined capacity the same as or different from an automatic capacity setting. The user-defined capacity may be selected before or after data is stored on the tape storage medium. The user-defined capacity also may be influenced by historical data access information and performance criteria.

The mapping module 306 of the tape media utilization module 202 is configured, in one embodiment, to map the user-defined capacity or automatic default capacity to a specific tape storage cartridge 116. For example, if a user selects via the selection module 304 20% as a user-defined capacity for a specific tape storage cartridge 116, the mapping module 306 stores a record that associates a 20% user-defined capacity with the particular tape storage cartridge 116. The record may be stored, in one embodiment, within a host 106 or a library manager 110 or on another storage device. The identification module 308 is configured to identify a tape storage cartridge 116 as "full" when a substantial portion of the user-defined capacity of the tape storage medium has been used to store the data.

The write module 310 is configured to write data from a host 106 to a tape storage medium on a tape storage cartridge 116 up to the user-defined capacity. The read module 312 is configured to read data from a tape storage medium on a tape storage cartridge 116 and send the retrieved data to a host 106.

Figure 4:
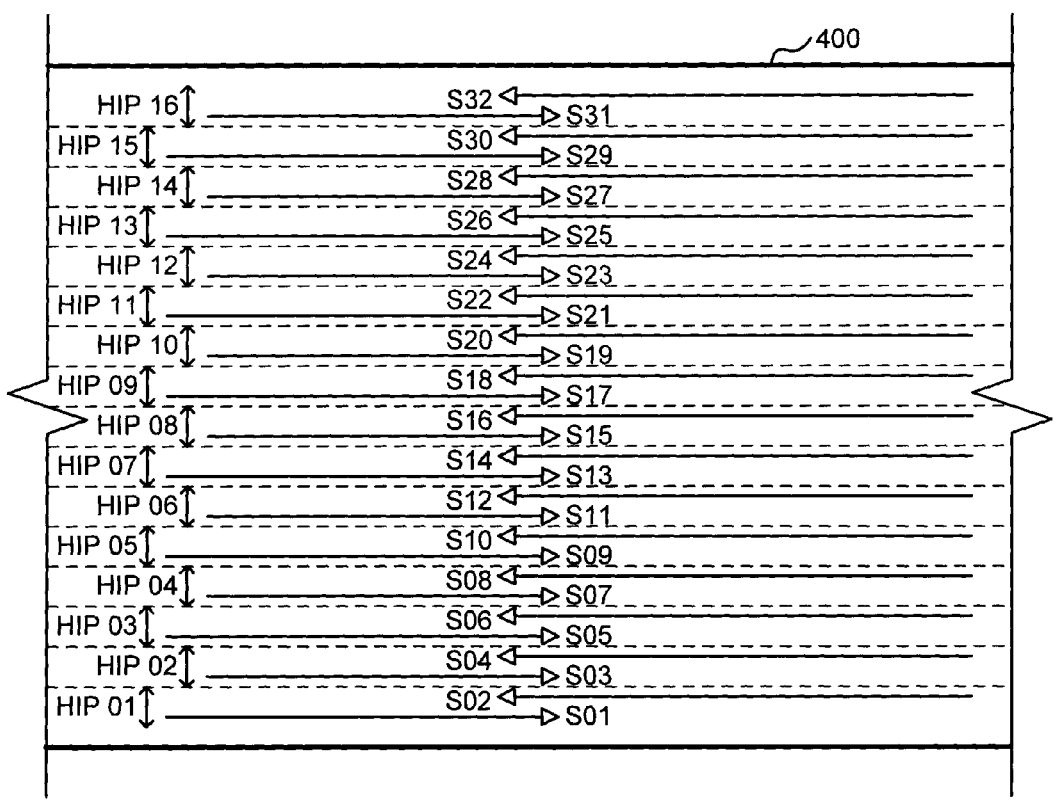
FIG. 4 is a schematic diagram illustrating one embodiment of a serpentine recording pattern on a section of a tape storage medium in accordance with the present invention.

FIG. 4 depicts one embodiment of a section of tape storage medium 400 that may be used to store data within a tape storage cartridge 116 described above. The illustrated tape storage medium 400 is formatted with serpentine recording path and is divided into sixteen head index positions (HIPs). In a further embodiment, the tape storage medium 400 may be formatted for interleaved longitudinal recording or another recording technique.

In one embodiment, each head index position (HIP) includes 32 tracks that are divided into two sets of sixteen tracks each. On a metal particle tape storage medium 400 that is approximately 12.7 mm [0.5"], for example, current technology allows 512 tracks of data (32 tracks for each of sixteen head index positions). In this way, using the proper tape drive unit 112, sixteen tracks of data may be written or read at the same time with a single pass of a read or write head, respectively, over the tape storage medium 400.

For example, a write head (not shown) may begin writing data to the track set "S01" within the head index position "HIP 01" at the beginning of the tape storage medium 400 and write approximately to the physical end of the tape storage medium 400. The write head may then pass in the opposite direction over the track set "S02," still within the head index position "HIP 01," and write data to the proximate sixteen tracks over the entire length of the tape storage medium 400. In a single round trip, data may be written over 32 tracks within a single head index position (HIP). In one embodiment, current technology employs a tape storage medium 400 that is approximately 580 m [1902.9 ft] in length and may store as much as 300 Gb of non-compacted data.

Figure 5:
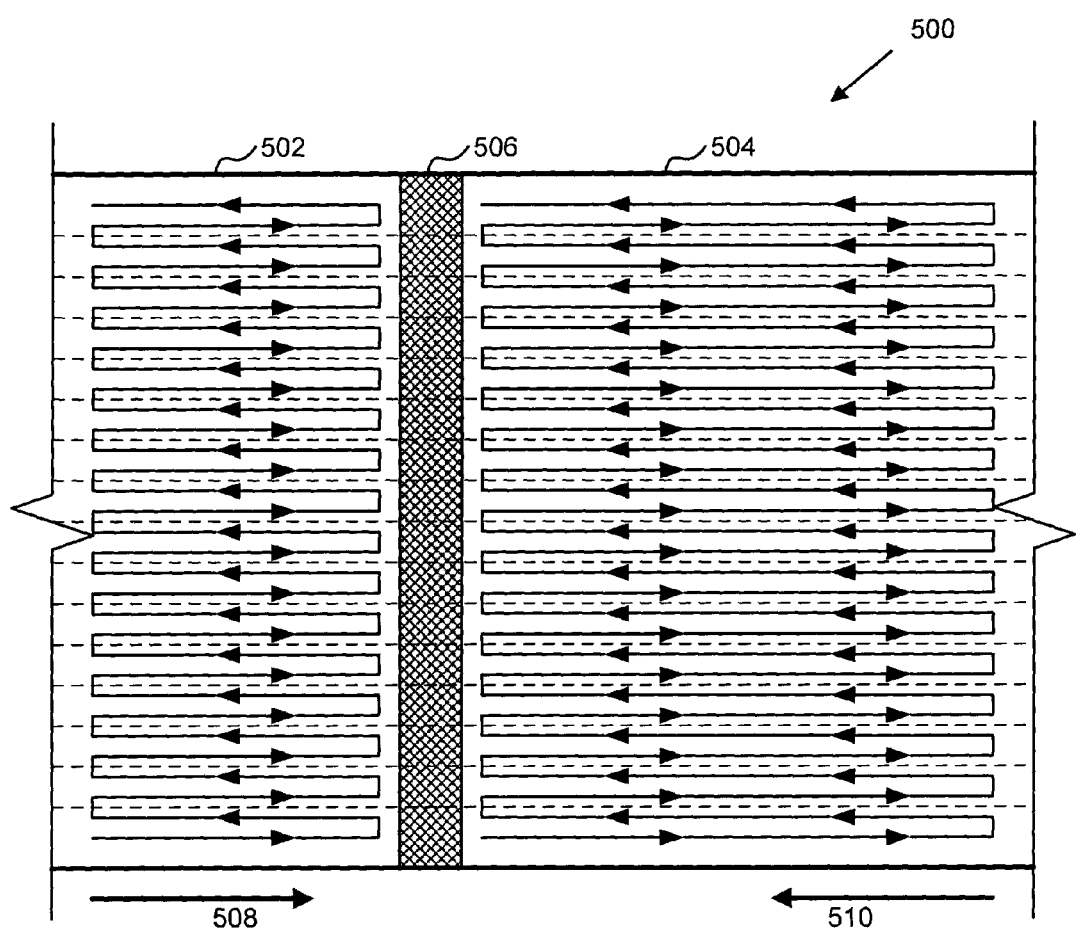
FIG. 5 is a schematic diagram illustrating one embodiment of a section of a segmented tape storage medium in accordance with the present invention.

FIG. 5 depicts one embodiment of a section of tape storage medium 500 that is similar to the tape storage medium 400 shown in FIG. 4. However, the tape storage medium 500 of FIG. 5 is segmented into two segments, a first segment 502 and a second segment 504. In one embodiment, for example, which uses a tape storage medium 500 with a total capacity of 300 Gb, the tape storage medium 500 may be segmented into a first segment 502 of approximately 60 Gb and a second segment 504 of the remaining 240 Gb.

In the depicted embodiment, the first segment 502 may be separated from the second segment 504 by a segment header 506. The segment header 506 may include information descriptive of the data stored in the second segment 504. On either side of the segment header 506, the tape storage medium 500 may include data pads, similar to a data pad at the physical beginning or end of the tape storage medium 500. The data pads provide a small buffer between the data written in the segment header 506 and the data written in the first and second segments 502, 504. In another embodiment, there may not be a segment header 506. Instead, an application storing data and the tape drive 112 may cooperate to car track and maintain a logical division between the first segment 502 and the second segment 504.

The depicted tape storage medium 500 shows the serpentine recording paths within the first and second segments 502, 504. For example, in the first segment 502, data may be recorded on the track set "S01" in a forward direction 508 up to approximately the N° segment header 506 and then on the track set "S02" in a reverse direction 510 back to the beginning of the tape storage medium. Data may then be recorded on the track set "S03" in the forward direction 508 and on the track set "S04" in the reverse direction 510. This recording pattern may continue until the entire first segment 502 contains data. Data may then be recorded beginning on track set "S01" in the second segment 504 after the segment header 506 until the end of the tape storage medium 500. Data may then be recorded on the track set "S02" within the second segment 504 from the end of the tape storage medium 500 back to the segment header 506. This recording pattern likewise may continue until the entire second segment 504 contains data.

Figure 6:
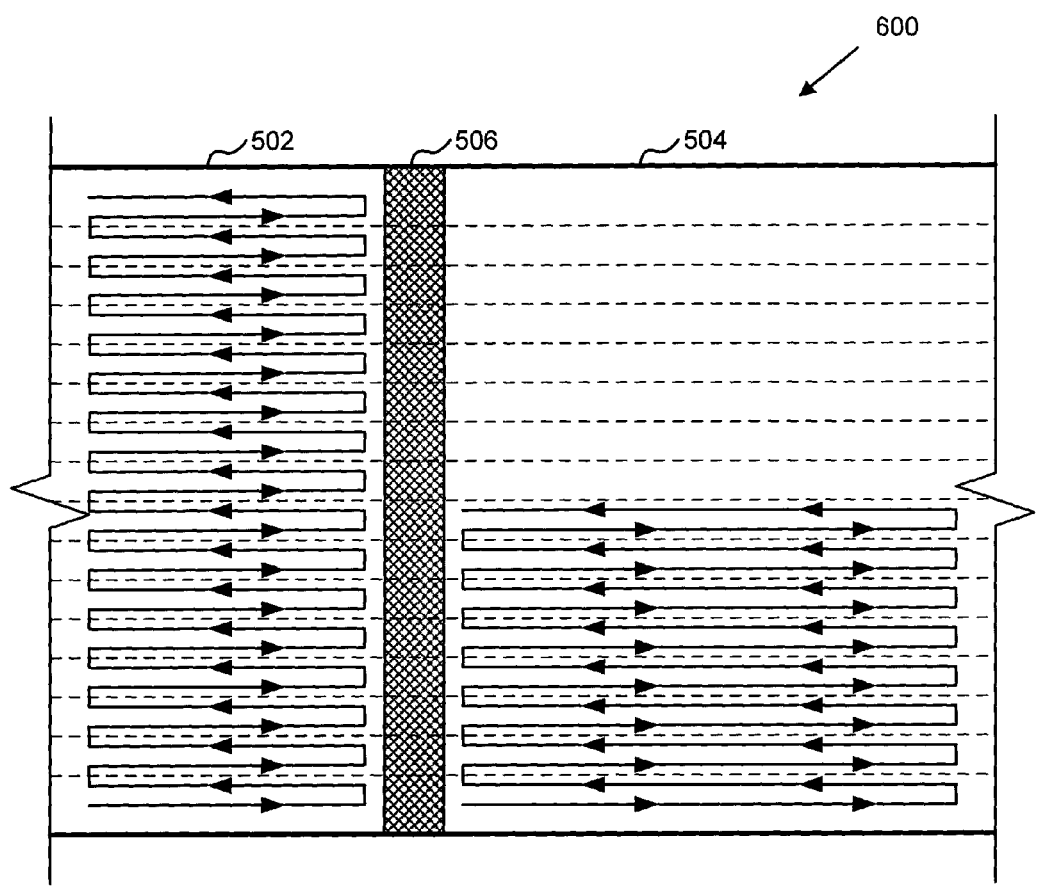
FIG. 6 is a schematic diagram illustrating an alternative embodiment of a section of segmented tape storage medium in accordance with the present invention.

In an alternate embodiment, data may be written to only a portion of the first segment 502 and/or a portion of the second segment 504. As shown in FIG. 6, the first segment 502 of a tape storage medium 600 may be fully written while the second segment 504 may be only partially written through the track sets "S01" through "S16," for example.

Figure 7:
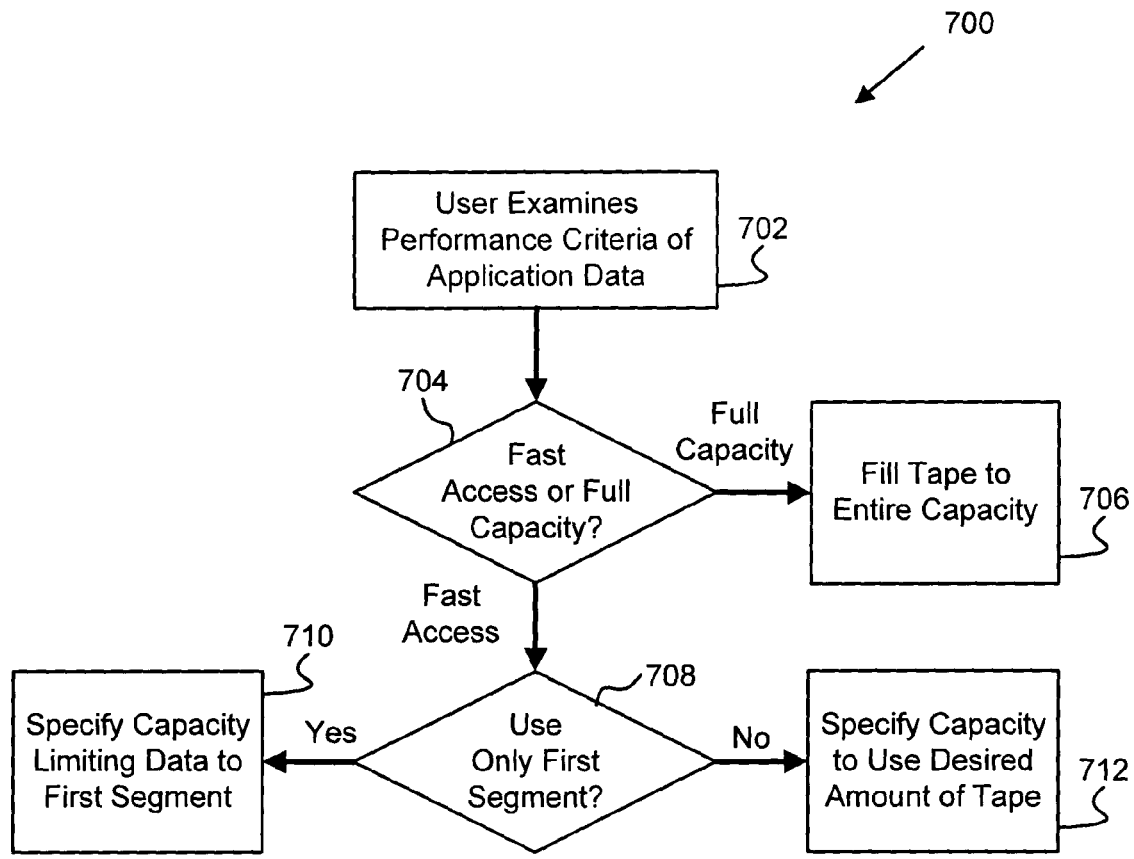
FIG. 7 is a schematic flow chart diagram illustrating one embodiment of a method for selecting a user-defined capacity for a given tape storage medium in accordance with the present invention.

FIG. 7 depicts one embodiment of a selection process 700 for selecting a user-defined capacity for a given tape storage medium 500 within a tape storage cartridge 116. The depicted selection process 700 starts when a user determines 702 storage performance criteria for application data. Next, the user determines 704 whether the application data should be stored for fast access or for full capacity. As used herein, fast access refers to storing data on a first segment of a tape media. The first segment being the first segment encountered when a rewound tape is first mounted. Because the tape drive makes less mechanical movement, particularly for serpentine tracks, data access is faster than accessing subsequent segments on a tape cartridge 116.

If a user selects full capacity, the tape cartridge 116 is filled 706 with data to its full capacity. If a user selects fast access, a determination 708 is made whether to store the application data on just the first segment or allow the data to spill over into one or more subsequent segments. If only the first segment is selected, the user specifies 710 the capacity for the first segment as an actual value or as a percentage of the size of the tape media. Data stored to the tape media is then limited to the first segment. If the user decides to use more segments than just the first segment, the user specifies 712 the capacity to use for the tape media. If the data stored exceeds the first segment, the data is written on subsequent segments.

The user-defined capacity for a specific tape storage cartridge 116 may vary. For example, a user may define a capacity that is equal to the size of the first segment 502, such as 60 Gb (20% of 300 Gb), of the tape storage medium 500. In an alternative embodiment, the user may define a capacity that is either smaller or larger than the first segment 502. In a further embodiment, the user may specify a capacity that includes more than two segments on the tape storage medium 500 if the tape storage medium 500 is formatted with a plurality of segments. For example, FIG. 6 may depict a tape storage medium 600 that is formatted in two segments 502, 504 and defined to have a capacity of 60%. Assuming the first segment 502 and second segment 504 are formatted to include approximately 20% and 80%, respectively, of the total capacity, the tape storage medium 600, when written to capacity, would fill all (20%) of the first segment 502 and then fill half (40%) of the second segment 504.

Figure 8:
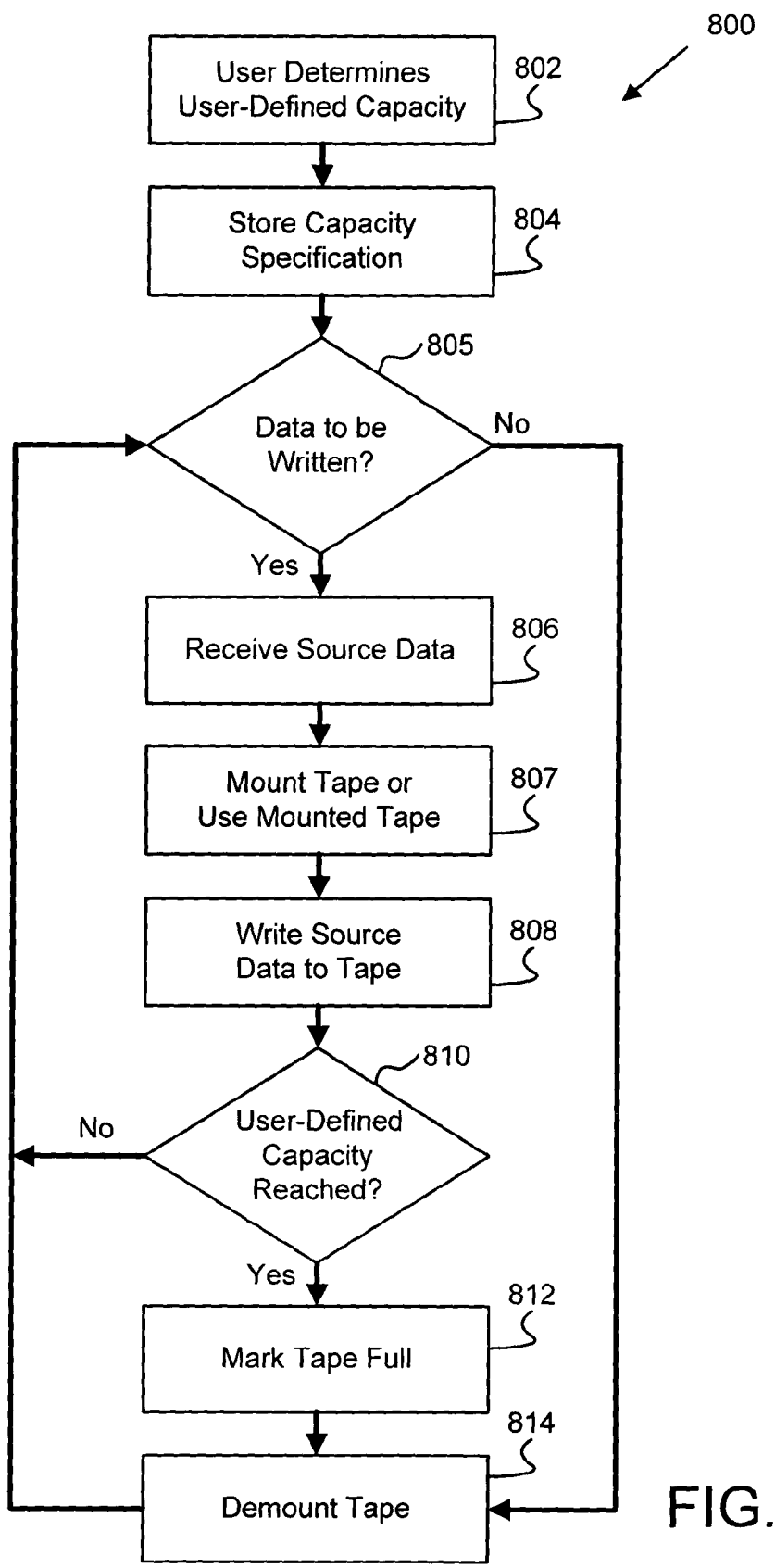
FIG. 8 is a schematic flow chart diagram illustrating one embodiment of a method for storing data that utilizes tape storage media segmentation to improve data access performance.

FIG. 8 illustrates a method 800 for storing data that utilizes tape storage media segmentation to improve data access performance. The method 800 begins once a user has determined 802 the appropriate user-defined capacity for the tape storage cartridge 116. This is described above in relation to FIG. 7. Preferably, the user-defined capacity is stored 804 as a capacity specification for the application that will be storing data on the tape storage media 116.

The method 800 then determines 805 if data is to be written. Next, the source data to be stored on the tape storage media 116 is received 806. In one embodiment, the tape drive unit 112 receives 806 the source data. The tape drive 112 mounts 807 a tape, if necessary, and begins writing 808 the source data to a segmented tape storage media 116. Next, a determination 810 is made whether the user-defined capacity has been reached. This determination 810 is made by the application in the host 106 with reference to the storage capacity specification 804.

If the user-defined capacity has not been reached, the application on the host 106, for example, may continue to receive 806 and write 808 source data until the user defined capacity is reached 810. Once the user-defined capacity of the tape storage medium 116 is reached, the application on the host 106 considers and marks 812 the tape storage medium 116 "full." The tape storage media 116 is then demounted 814 and the application determines 805 if there is more data to be written. After all of the data has been written, the tape is demounted 814, if mounted, and the method 800 ends.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A process for utilizing tape storage media segmentation to improve data access performance, the process comprising:
providing a tape storage device having a tape storage medium, the tape storage medium formatted with a serpentine recording path and divided into sixteen head index positions, each head index position including thirty-two tracks;
accessing at least one of a first segment and a second segment on the tape storage medium;
allowing a user to select a user-defined capacity of the tape storage medium that is equivalent to the capacity of the first segment of the tape storage medium and that is less than a usable capacity of the tape storage medium; and
identifying a tape storage device as full when the user-defined capacity of the tape storage medium is used to store the data and to mark the tape storage medium as full.

2. The process of claim 1, wherein allowing a user to select a user-defined capacity further comprises allowing the user to select the user-defined capacity of the tape storage medium before the data has been stored on the tape storage medium.

3. The process of claim 1, wherein allowing a user to select a user-defined capacity further comprises allowing the user to select the user-defined capacity of the tape storage medium after the data has been stored on the tape storage medium.

4. The process of claim 1, further comprising associating the user-defined capacity of the tape storage medium with the tape storage device.

5. The process of claim 1, further comprising writing data to the tape storage medium within the user-defined capacity.

\* \* \* \* \*